July 10, 1934.  W. M. HAMON  1,965,831
SOCKET
Filed April 4, 1933
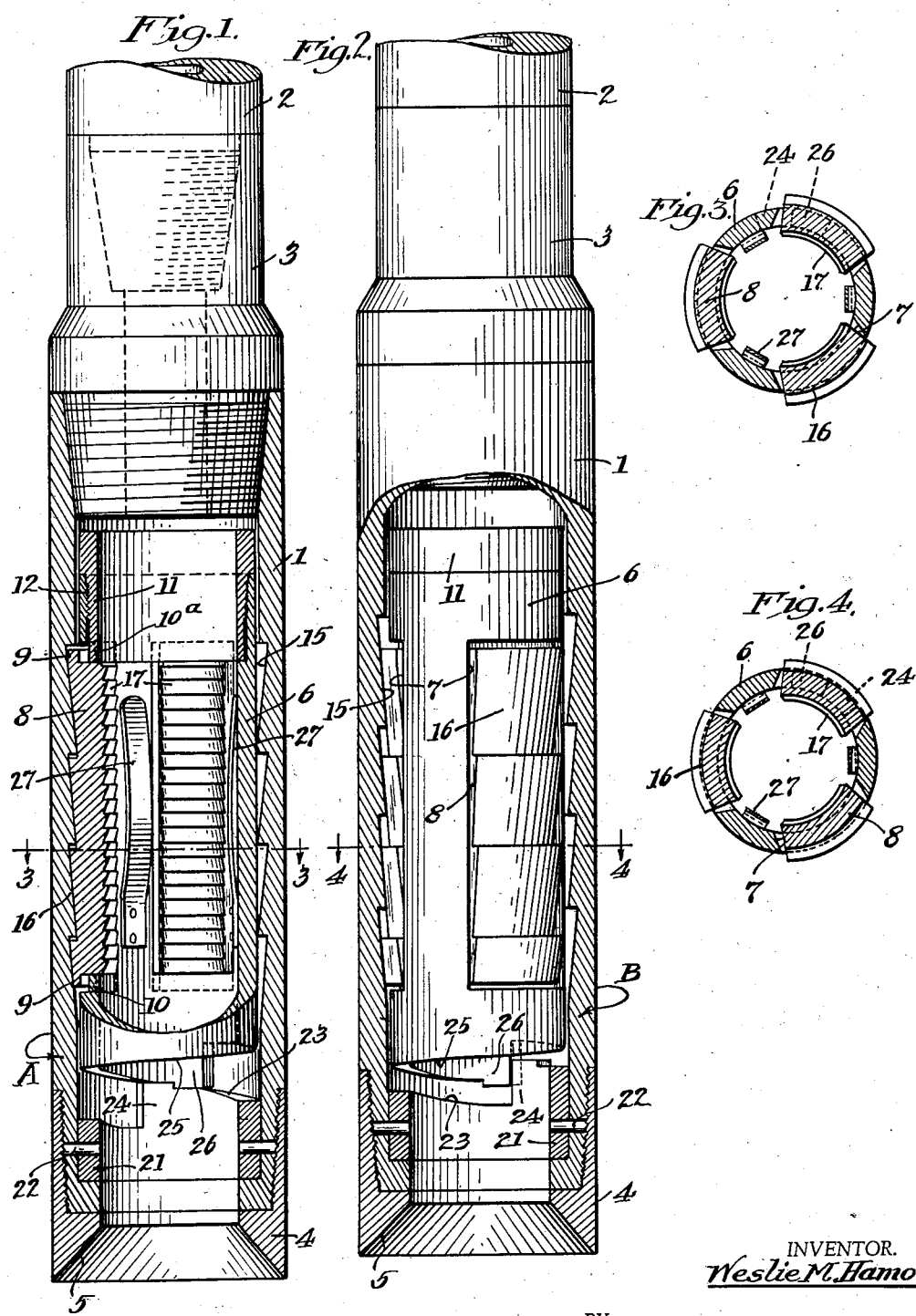

Patented July 10, 1934

1,965,831

UNITED STATES PATENT OFFICE 1,965,831

SOCKET

Weslie M. Hamon, Bell, Calif.

Application April 4, 1933, Serial No. 664,315

3 Claims. (Cl. 294—102)

This invention is a fishing tool of the socket type having slips, and adapted to be received over a tubular member which has been lost in a well, with the slips adapted for radial contraction to grip the outer periphery of the lost member for recovering the same; and it is an object of the invention to incorporate the radially contractible slip structure in the bore of a socket, so that the slips are normally locked in inoperative expanded position but may be released for operative contraction to grip the lost member, and may be relieved from their gripping engagement and returned to normal expanded position at any time.

It is a further object of the invention to incorporate the slip structure in the bore of a socket so that the slips and the body of the socket are normally locked against relative longitudinal movement with the slips in inoperative expanded position, and with the locking engagement adapted for release for relative longitudinal movement of the slips and the body for operatively contracting the slips.

It is a still further object of the invention to incorporate the slip structure in the bore of a socket so that the locking engagement whereby the slips are normally held in inoperative expanded position, may be released by rotating the socket in one direction, and after the slips have radially contracted and gripped a lost member their gripping engagement may be relieved and they may be again locked in their normal inoperative position by rotating the socket in the opposite direction.

It is a still further object to provide an extremely simplified construction whereby the slips may be adapted for radial expansion and contraction, and are adapted for convenient assembly in the bore of a body so as to provide a fishing tool of the socket type, i. e. of the type wherein the tool is received over the lost tubular member and the slips are radially contracted in the bore of the body for gripping engagement with the outer periphery of the lost member.

It is a still further object of the invention to provide a support for the slips which is of simplified construction and adapted for convenient operative assembly in the bore of the body, and to also provide a practical means for securing the slips on the support so as to permit ready removal and replacement.

Further objects of the invention will be readily understood from the following description of the accompanying drawing, in which:

Fig. 1 is a side elevation of the socket, partly in axial section, and showing the slips locked in normal inoperative expanded position.

Fig. 2 is a similar view showing the locking engagement released and the slips in their operative contracted position.

Figs. 3 and 4 are transverse sections on the lines 3—3 and 4—4 respectively of Figs. 1 and 2.

The invention comprises a fishing tool of that type known as a socket and adapted to be received over a tubular member lost in a well, for radial contraction of its slips so as to grip the outer periphery of the lost member, and includes a body 1 having a bore in which the lost member is received, and adapted for suspension from a suitable drill string 2, preferably by a sub 3 which is threaded into the upper end of the body 1. A shoe 4 having a tapering bore 5 is preferably secured to the lower end of the body for guiding the lost member into the bore of the body as the socket is lowered over the member.

A slip structure is supported in the bore of body 1, with the slips normally radially expanded to inoperative position but adapted for radial contraction so as to grip the outer periphery of the lost tubular member over which the socket has been lowered, and the slips are preferably mounted in a tubular cage 6 which has a sliding fit in the bore of the body 1, and which provides for ready assembly and radial expansion and contraction of the slips. As an instance of this arrangement the cage 6 has a plurality of circumferentially spaced longitudinal openings 7 terminating short of the ends of the cage, and an elongated transversely arcuate slip 8 is received in each opening. When the parts are operatively assembled each slip is held against radial outward displacement from the cage 6 by radial abutment against the surrounding body 1, and is arranged for limited radial contraction into the bore of the supporting cage. For this purpose ribs 9 may project longitudinally beyond the respective ends of each slip at its outer periphery, and cooperating ribs 10—10$^a$ may project longitudinally into each opening 7 at its respective ends and at the inner peripheral portion of the tubular cage 6, so that the slips are radially slidably supported between the ribs 10—10$^a$, with the engagement of ribs 9 with the ribs 10—10$^a$ limiting radial contraction of the slips so as to maintain the slips in assembled relation in the openings 7 of the supporting cage.

Means are provided for releasing the slips from the openings 7 so that they may be completely retracted into the bore of cage 6 and withdrawn longitudinally therethrough when disassembling the tool for replacement or repair, and for this purpose the upper ribs 10ª of the cage are longitudinally retractible from the openings 7 so as to clear the upper ribs 9 of the slips, and thus permit the slips being readily withdrawn into the bore of the cage. As an instance of this arrangement the ribs 10ª may be formed by the lower end of a collar 11 which is adapted for threaded reception in the upper end of the bore of cage 6 as shown at 12, so that the collar 11 may be longitudinally projected into or retracted from the cage for operatively or inoperatively positioning the ribs 10ª.

The slips are normally radially expanded relative to their cage to the limit of movement permitted by the surrounding body 1, in which position they are adapted for sliding non-gripping engagement with the outer periphery of a tubular member (not shown) which has been lost in a well and over which the tool has been lowered; and by elevating the body 1 relative to the cage 6, the slips which are carried by the cage are radially contracted so as to tightly grip the lost member and thus permit its recovery by withdrawing the tool from the well. As an instance of this arrangement the bore of body 1 and the outer peripheries of the slips 8 have cooperating wedging surfaces 15—16 inclined downwardly and radially inwardly, so that when the cage 6 is elevated relative to the body 1 as shown at Figs. 1 and 3, the cooperating wedging surfaces permit maximum radial expansion of the slips, and when the body is elevated relative to the cage as shown at Figs. 2 and 4, the cooperating wedging surfaces force the slips radially inwardly to their contracted gripping position. The cooperating surfaces 15—16 are preferably each made up of a plurality of superimposed wedging surfaces extending all the way around the body 1 and the slips 8 respectively, and the inner peripheral surfaces of the slips are preferably serrated as shown at 17 to insure tight gripping engagement with the lost tubular member.

Means are provided for locking the cage 6 and the body 1 against relative longitudinal movement, with the cage elevated relative to the body for normal maximum expansion of the slips; and the locking means is releasable to permit elevation of the body relative to the cage for operatively contracting the slips. After the lost tubular member has been gripped by the contracted slips, the body and the cage may be again relatively longitudinally shifted for releasing the gripping engagement of the slips if so desired, and the body and the cage may then be again locked against relative longitudinal movement so that the slips are again in normal inoperative position. The locking means is preferably locked or released by respectively rotating the body 1 in one direction or the other relative to the cage 6.

As an instance of this arrangement an annular abutment is formed in the bore of body 1, preferably by securing a collar 21 in said bore by means of pins 22, and this abutment cooperates with the cage 6 so that the cage is normally elevated relative to the body 1 as shown at Fig. 1. The abutment locks the body and cage against relative rotation in one direction while permitting rotation of the body relative to the cage in the opposite direction, for example counterclockwise, and as a result of this counterclockwise rotation of the body the abutment is shifted so as to permit elevation of the body relative to the cage for operatively contracting the slips as previously described. The abutment permits only limited counterclockwise rotation of the body, and after the body has been elevated relative to the cage so as to operatively contract the slips, the abutment provides for rotation of the body in the opposite direction, in the present instance clockwise; and as a result of this clockwise rotation the abutment is shifted so as to elevate the cage relative to the body for expanding and releasing the gripping engagement of the slips, with the abutment then again locking the body and the cage against relative longitudinal movement.

For this purpose the abutment comprises a circumferentially inclined or spiral cam surface 23 having a stop 24 at its upwardly projecting high point, and the lower end of cage 6 forms a cooperating spiral cam surface 25 having a stop 26 at its depending high point. The stops 24—26 normally circumferentially engage as shown at Fig. 1 so as to permit rotation of body 1 relative to the cage only in a counterclockwise direction, in which position the high points of the cooperating cams longitudinally abut so as to lock the cage in elevated position relative to the body. The slips are thus expanded and the tool may be lowered into a well and received over a lost tubular member.

The cage 6 is held against rotation on the lost tubular member, preferably by bowed springs 27 in the bore or cage 6 which are adapted to yieldably frictionally engage the lost member, and the body 1 is then rotated in a counterclockwise direction relative to the non-rotative cage as shown by arrow A at Fig. 1, until the other sides of the cooperating stops 24—26 circumferentially engage, in which position the high point of each cam longitudinally alines with the low point of the cooperating cam as shown at Fig. 2, so that a lifting force on the drill string elevates the body 1 relative to cage 6 as also shown at Fig. 2, thereby operatively contracting the slips for tightly gripping the lost member. The lost member may thus be recovered by withdrawing the drill string from the well.

When it is desired to release the gripping engagement, the body 1 is rotated clockwise relative to the cage 6 as shown by arrow B at Fig. 2, until the stops 24—26 again circumferentially engage as shown at Fig. 1, and during this rotation the cam surface 23 exerts a longitudinal thrust against the cooperating cam surface 25, for elevating cage 6 relative to body 1 and thus expanding and again locking the slips in their original position as shown at Fig. 1.

The invention thus provides a fishing tool having its slips normally locked in radially expanded inoperative position and adapted for release and operative contraction by rotating and elevating the body relative to the slips, with the slip structure and its actuating means adapted for compact assembly in the bore of a body so as to provide a fishing tool of the socket type, and with the slips so supported as to provide for their convenient mounting and replacement, even though the tool is of the socket type, in which type of tool the parts are otherwise comparatively inaccessible and difficult to assemble, due to the internal mounting of the slips with relation to the body.

I claim:

1. In a socket, a body having a bore, a slip mounted in the bore of the body, a wedging engagement between the outer periphery of the slip and the wall of the bore of the body operable by relative longitudinal movement of the body and slip for radially inwardly contracting the slip for gripping engagement with a lost object which has been received in the bore of the body by lowering the socket thereover, an abutment fixed relative to the slip and having a depending high point, and a cooperating abutment fixed in the bore of the body below the first mentioned abutment and having an upwardly projecting high point, said high points normally longitudinally abutting for holding the body and slip against relative longitudinal movement, and the body and slip being adapted for relative rotation for moving the high points out of longitudinal alinement so as to permit relative longitudinal movement of the body and slip.

2. In a socket, a body having a bore, a cage adapted for reception in the bore of the body and having an opening in its peripheral wall, a slip mounted in said opening, a wedging engagement between the outer periphery of the slip and the wall of the bore of the body operable by relative longitudinal movement of the body and cage for radially inwardly contracting the slip for gripping engagement of its inner periphery with a lost object which has been received in the bore of the cage by lowering the socket thereover, the lower end of the cage forming a surface having a depending high point, and an abutment in the bore of the body below the cage forming a cooperating surface having an upwardly projecting high point, said high points normally longitudinally abutting for holding the body and cage against relative longitudinal movement, and the body and cage being adapted for relative rotation for moving the high points out of longitudinal alinement and thereby longitudinally spacing the cooperating surfaces so as to permit relative longitudinal movement of the body and cage.

3. In a socket, a body having a bore, a cage adapted for reception in the bore of the body and having an opening in its peripheral wall, a slip mounted in said opening, the slip being held against outward displacement by the surrounding body, retaining means for limiting radial inward movement of the slip relative to its cage, means for releasing said retaining means for removal of the slip by withdrawal into the bore of the cage, a wedging engagement between the outer periphery of the slip and the wall of the bore of the body operable by relative longitudinal movement of the body and cage for radially inwardly contracting the slip for gripping engagement of its inner periphery with a lost object which has been received in the bore of the cage by lowering the socket thereover, the lower end of the cage forming a surface having a depending high point, and an abutment in the bore of the body below the cage forming a cooperating surface having an upwardly projecting high point, said high points normally longitudinally abutting for holding the body and cage against relative longitudinal movement, and the body and cage being adapted for relative rotation for moving the high points out of longitudinal alinement and thereby longitudinally spacing the cooperating surfaces so as to permit relative longitudinal movement of the body and cage.

WESLIE M. HAMON.